(12) United States Patent
Namgoong et al.

(10) Patent No.: US 11,871,261 B2
(45) Date of Patent: Jan. 9, 2024

(54) TRANSFORMER-BASED CROSS-NODE MACHINE LEARNING SYSTEMS FOR WIRELESS COMMUNICATION

(71) Applicant: QUALCOMM Incorporated, San Diego, CA (US)

(72) Inventors: June Namgoong, San Diego, CA (US); Yang Yang, San Diego, CA (US); Hyojin Lee, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/452,697

(22) Filed: Oct. 28, 2021

(65) Prior Publication Data
US 2023/0136354 A1 May 4, 2023

(51) Int. Cl.
*H04W 4/00* (2018.01)
*H04W 24/10* (2009.01)
*H04B 7/0456* (2017.01)
*H04L 5/00* (2006.01)
*H04W 72/23* (2023.01)

(52) U.S. Cl.
CPC .......... *H04W 24/10* (2013.01); *H04B 7/0478* (2013.01); *H04B 7/0482* (2013.01); *H04L 5/0048* (2013.01); *H04W 72/23* (2023.01)

(58) Field of Classification Search
CPC . H04W 24/10; H04W 72/23; H04W 74/0833; H04L 5/0048; H04L 25/0254
See application file for complete search history.

(56) References Cited

U.S. PATENT DOCUMENTS

| | | | | |
|---|---|---|---|---|
| 2013/0114763 | A1* | 5/2013 | Park ................. | H04B 7/0469 375/296 |
| 2016/0329937 | A1* | 11/2016 | Shi .................. | H04L 5/0091 |
| 2018/0063693 | A1* | 3/2018 | Chakraborty ...... | H04W 8/005 |
| 2019/0342907 | A1* | 11/2019 | Huang .............. | H04W 72/23 |
| 2020/0186207 | A1* | 6/2020 | Davydov .......... | H04B 7/0469 |
| 2020/0394559 | A1* | 12/2020 | Zhang .............. | G06N 3/045 |
| 2021/0028843 | A1* | 1/2021 | Zhou ............... | H04B 7/063 |
| 2022/0287104 | A1* | 9/2022 | Jeon ............. | H04W 74/0833 |
| 2022/0368495 | A1* | 11/2022 | Abdelghaffar ...... | H04B 7/0695 |
| 2023/0028423 | A1* | 1/2023 | Xu ................. | H04W 36/06 |
| 2023/0128008 | A1* | 4/2023 | Clement ........... | G06F 8/30 717/124 |

* cited by examiner

*Primary Examiner* — Abdelnabi O Musa
(74) *Attorney, Agent, or Firm* — QUALCOMM Incorporated

(57) ABSTRACT

Various aspects of the present disclosure generally relate to wireless communication. In some aspects, a user equipment (UE) may receive a transformer configuration that includes a transmitter neural network configured to be used to generate at least one latent vector corresponding to one or more computation tasks of a plurality of computation tasks associated with a transformer-based cross-node machine learning system. The UE may transmit the at least one latent vector based at least in part on instantiating the transmitter neural network. Numerous other aspects are described.

30 Claims, 9 Drawing Sheets

TRANSFORMER-BASED CROSS-NODE MACHINE LEARNING SYSTEMS FOR WIRELESS COMMUNICATION

FIELD OF THE DISCLOSURE

Aspects of the present disclosure generally relate to wireless communication and to techniques and apparatuses for transformer-based cross-node machine learning systems for wireless communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5 G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a transformer configuration that includes a transmitter neural network configured to be used to generate at least one latent vector corresponding to one or more computation tasks of a plurality of computation tasks associated with a transformer-based cross-node machine learning system. The one or more processors may be configured to transmit the at least one latent vector based at least in part on instantiating the transmitter neural network.

Some aspects described herein relate to a base station for wireless communication. The base station may include a memory and one or more processors coupled to the memory. The one or more processors may be configured to transmit, to a UE, a transformer configuration that includes a transmitter neural network configured to be used to generate at least one latent vector corresponding to one or more computation tasks of a plurality of computation tasks associated with a transformer-based cross-node machine learning system. The one or more processors may be configured to receive, from the UE and based at least in part on instantiation of the transmitter neural network by the UE, the at least one latent vector.

Some aspects described herein relate to a method of wireless communication performed by a UE. The method may include receiving a transformer configuration that includes a transmitter neural network configured to be used to generate at least one latent vector corresponding to one or more computation tasks of a plurality of computation tasks associated with a transformer-based cross-node machine learning system. The method may include transmitting the at least one latent vector based at least in part on instantiating the transmitter neural network.

Some aspects described herein relate to a method of wireless communication performed by a base station. The method may include transmitting, to a UE, a transformer configuration that includes a transmitter neural network configured to be used to generate at least one latent vector corresponding to one or more computation tasks of a plurality of computation tasks associated with a transformer-based cross-node machine learning system. The method may include receiving, from the UE and based at least in part on instantiation of the transmitter neural network by the UE, the at least one latent vector.

Some aspects described herein relate to a non-transitory computer-readable medium that stores a set of instructions for wireless communication by a UE. The set of instructions, when executed by one or more processors of the UE, may cause the UE to receive a transformer configuration that includes a transmitter neural network configured to be used to generate at least one latent vector corresponding to one or more computation tasks of a plurality of computation tasks associated with a transformer-based cross-node machine learning system. The set of instructions, when executed by one or more processors of the UE, may cause the UE to transmit the at least one latent vector based at least in part on instantiating the transmitter neural network.

Some aspects described herein relate to a non-transitory computer-readable medium that stores a set of instructions for wireless communication by a base station. The set of instructions, when executed by one or more processors of the base station, may cause the base station to transmit, to a UE, a transformer configuration that includes a transmitter neural network configured to be used to generate at least one latent vector corresponding to one or more computation tasks of a plurality of computation tasks associated with a transformer-based cross-node machine learning system. The set of instructions, when executed by one or more processors of the base station, may cause the base station to receive, from the UE and based at least in part on instantiation of the transmitter neural network by the UE, the at least one latent vector.

Some aspects described herein relate to an apparatus for wireless communication. The apparatus may include means for receiving a transformer configuration that includes a transmitter neural network configured to be used to generate at least one latent vector corresponding to one or more computation tasks of a plurality of computation tasks associated with a transformer-based cross-node machine learning system. The apparatus may include means for transmitting the at least one latent vector based at least in part on instantiating the transmitter neural network.

Some aspects described herein relate to an apparatus for wireless communication. The apparatus may include means for transmitting, to a UE, a transformer configuration that includes a transmitter neural network configured to be used to generate at least one latent vector corresponding to one or more computation tasks of a plurality of computation tasks associated with a transformer-based cross-node machine learning system. The apparatus may include means for receiving, from the UE and based at least in part on instantiation of the transmitter neural network by the UE, the at least one latent vector.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5 G or New Radio (NR) radio access technology (RAT), aspects of the present disclosure can be applied to other RATs, such as a 3 G RAT, a 4 G RAT, and/or a RAT subsequent to 5 G (e.g., 6 G).

Figure 1:
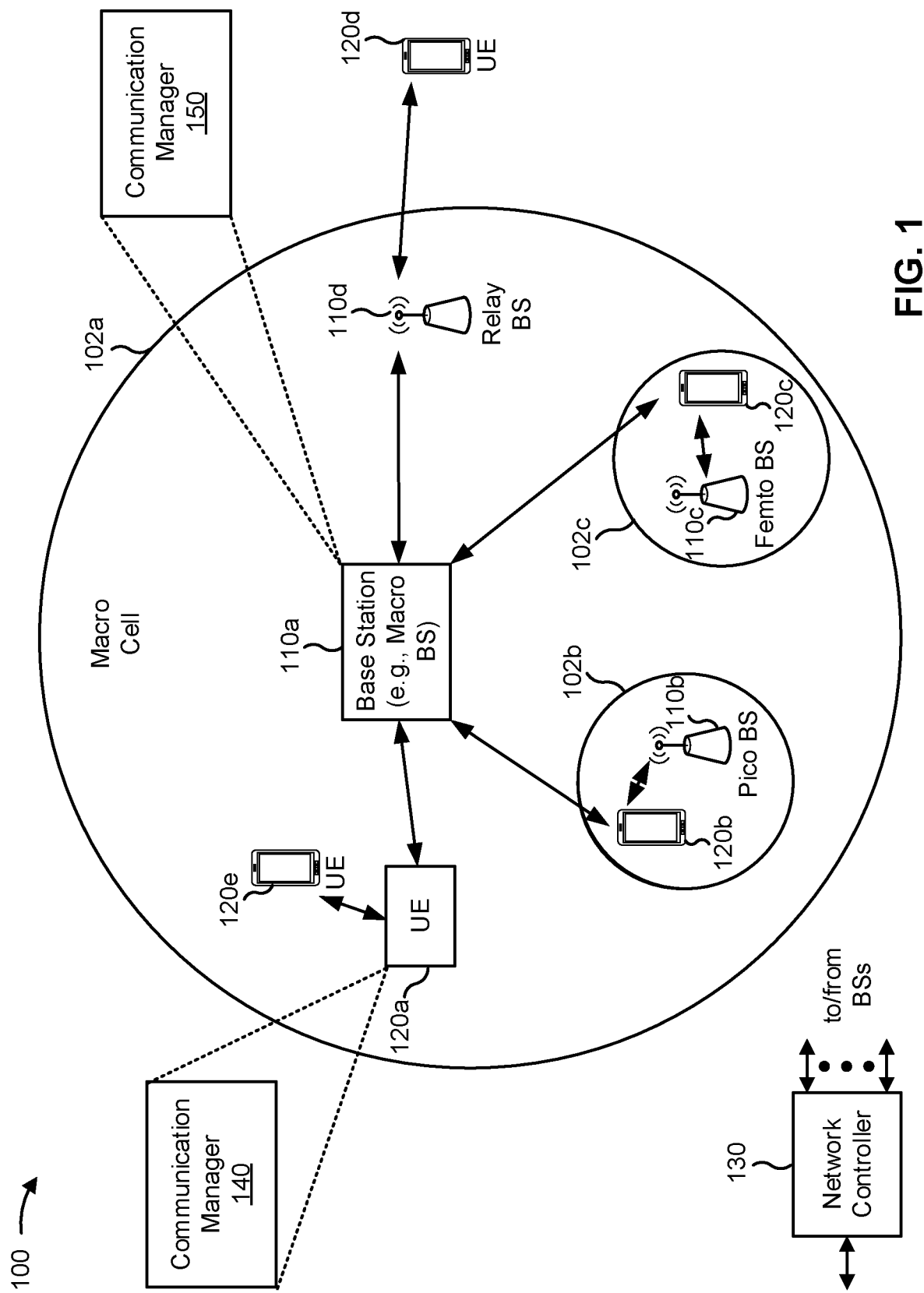
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5 G (e.g., NR) network and/or a 4 G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4 G), a gNB (e.g., in 5 G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5 G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5 G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5 G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5 G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a transformer configuration that includes a transmitter neural network configured to be used to generate at least one latent vector corresponding to one or more computation tasks of a plurality of computation tasks associated with a transformer-based cross-node machine learning system; and transmit the at least one latent vector based at least in part on instantiating the transmitter neural network. Additionally, or alternatively, the communication manager 140 may perform one or more other operations described herein.

In some aspects, the base station 110 may include a communication manager 150. As described in more detail elsewhere herein, the communication manager 150 may transmit, to a UE, a transformer configuration that includes a transmitter neural network configured to be used to generate at least one latent vector corresponding to one or more computation tasks of a plurality of computation tasks associated with a transformer-based cross-node machine learning system; and receive, from the UE and based at least in part on instantiation of the transmitter neural network by the UE, the at least one latent vector. Additionally, or alternatively, the communication manager 150 may perform one or more other operations described herein.

As indicated above, FIG. 1 is provided as an example. Other examples may differ from what is described with regard to FIG. 1.

Figure 2:
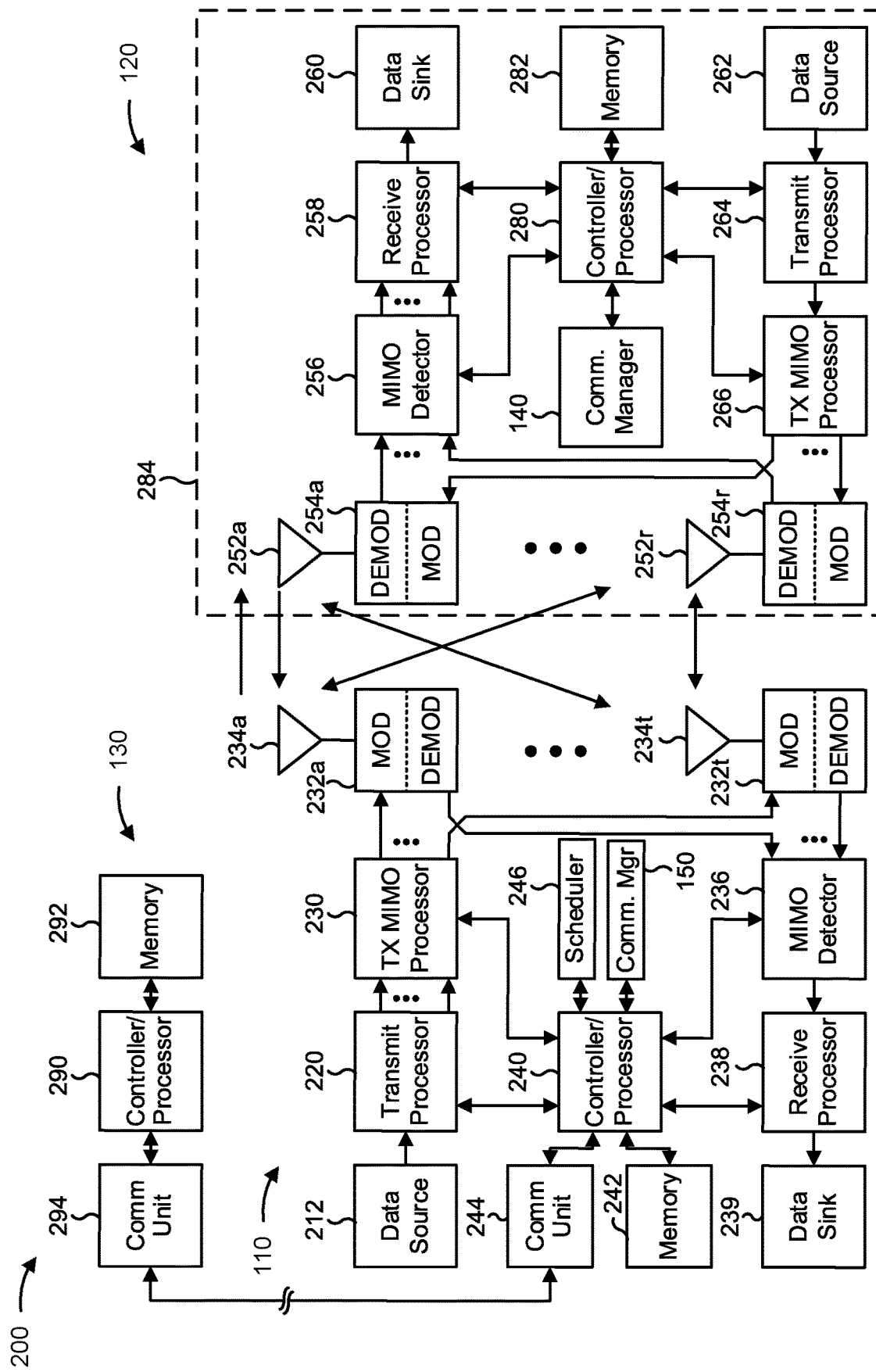
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with transformer-based cross-node machine learning systems for wireless communication, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving a transformer configuration that includes a transmitter neural network configured to be used to generate at least one latent vector corresponding to one or more computation tasks of a plurality of computation tasks associated with a transformer-based cross-node machine learning system; and/or means for transmitting the at least one latent vector based at least in part on instantiating the transmitter neural network. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a transformer configuration that includes a transmitter neural network configured to be used to generate at least one latent vector corresponding to one or more computation tasks of a plurality of computation tasks associated with a transformer-based cross-node machine learning system; and/or means for receiving, from the UE and based at least in part on instantiation of the transmitter neural network by the UE, the at least one latent vector. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE operating in a wireless network may measure reference signals to report to a base station. For example, the UE may measure reference signals during a beam management process for channel state feedback (CSF), may measure received power of reference signals from a serving cell and/or neighbor cells, may measure signal strength of inter-radio access technology (e.g., WiFi) networks, and/or may measure sensor signals for detecting locations of one or more objects within an environment, among other examples. However, reporting this information to the base station may consume communication and/or network resources.

In some aspects described herein, a UE may use one or more neural networks that may be trained to learn dependence of measured qualities on individual parameters, isolate the measured qualities through various layers of the one or more neural networks (also referred to as "operations"), and compress measurements in a way that limits compression loss. The UE may transmit the compressed measurements to the base station. The base station may decode the compressed measurements using one or more decompression operations and reconstruction operations associated with one or more neural networks. The one or more decompression and reconstruction operations may be based at least in part on a set of features of the compressed data set to produce reconstructed measurements. The base station may perform a wireless communication action based at least in part on the reconstructed measurements.

In some cases, neural networks may be trained using federated machine learning. Federated machine learning is a machine learning technique that enables multiple client network nodes to collaboratively learn neural network models, while a server does not collect the data from the clients.

In a typical case, federated learning techniques involve a single global neural network model trained from the data stored on multiple clients. In some cases, neural networks configured for use in wireless network environments can have functionality that is limited by limitations on network traffic, computational capacity, storage capacity, and/or power capacity, among other examples.

Transformer-based machine learning may has become a prevalent architecture in the field of natural language processing (NLP). Transformers use an attention mechanism that enjoys long range connections in comparison to other neural network architectures such as convolutional neural networks (CNNs) or recurrent neural networks (RNNs). Transformer-based encoders can be used for high-performance image classification tasks. Additionally, end-to-end object detection can be possible using transformer-based machine learning. Accordingly, the application of transformer-based architecture for wireless communications tasks may facilitate more efficient computations and better performance on those tasks.

Some aspects of techniques and apparatuses described herein may facilitate transformer-based cross-node multi-task learning for wireless communications. In cross-node multi-task learning, some computation operations corresponding to "tasks" may be performed by a transmitting node (e.g., a UE), and other computation operations may be performed by a receiving node (e.g., a base station) to complete those tasks. Some aspects of the techniques and apparatus described herein provide a signaling scheme to enable cross-node operations. In some aspects, a transformer-based cross-node machine learning system may include a transformer backbone (shared layers) and multiple head modules (task-specific layers), where each head module corresponds to a task. In this way, computation and/or parameter storage may be shared among different tasks.

For example, in some aspects, the transformer-based cross-node machine learning system may include one or more transmitter neural networks (which may be referred to as "TxNNs") instantiated by one or more UEs and one or more receiver neural networks (which may be referred to as "RxNNs") instantiated by a base station. In some aspects, a transmitter neural network may include the transformer backbone and the first few layers of the head modules, and a receiver neural network for a particular task may include the remaining layers of the corresponding head module. In some aspects, a head module may include a multilayer perceptron (MLP), a CNN, and/or a transformer encoder, among other examples.

Aspects of the techniques described herein may be used for any number of cross-node machine learning challenges including, for example, facilitating channel state feedback, facilitating positioning of a client, and/or learning of modulation and/or waveforms for wireless communication, among other examples. For example, if channel information is used as input to the transformer backbone, tasks corresponding to the head modules may include channel state information (CSI) compression and/or reconstruction, environment classification (e.g., indoor environment vs. outdoor environment), first arriving path estimation, line-of-sight (LOS)/non-LOS (NLOS) channel classification, and/or computation of precoders for MIMO transmission ranks, among other examples. In some aspects, the UE may not be aware of the nature of the task corresponding to computations that it performs using a transmitter neural network, as the UE may simply follow orders received from a base station.

Figure 3:
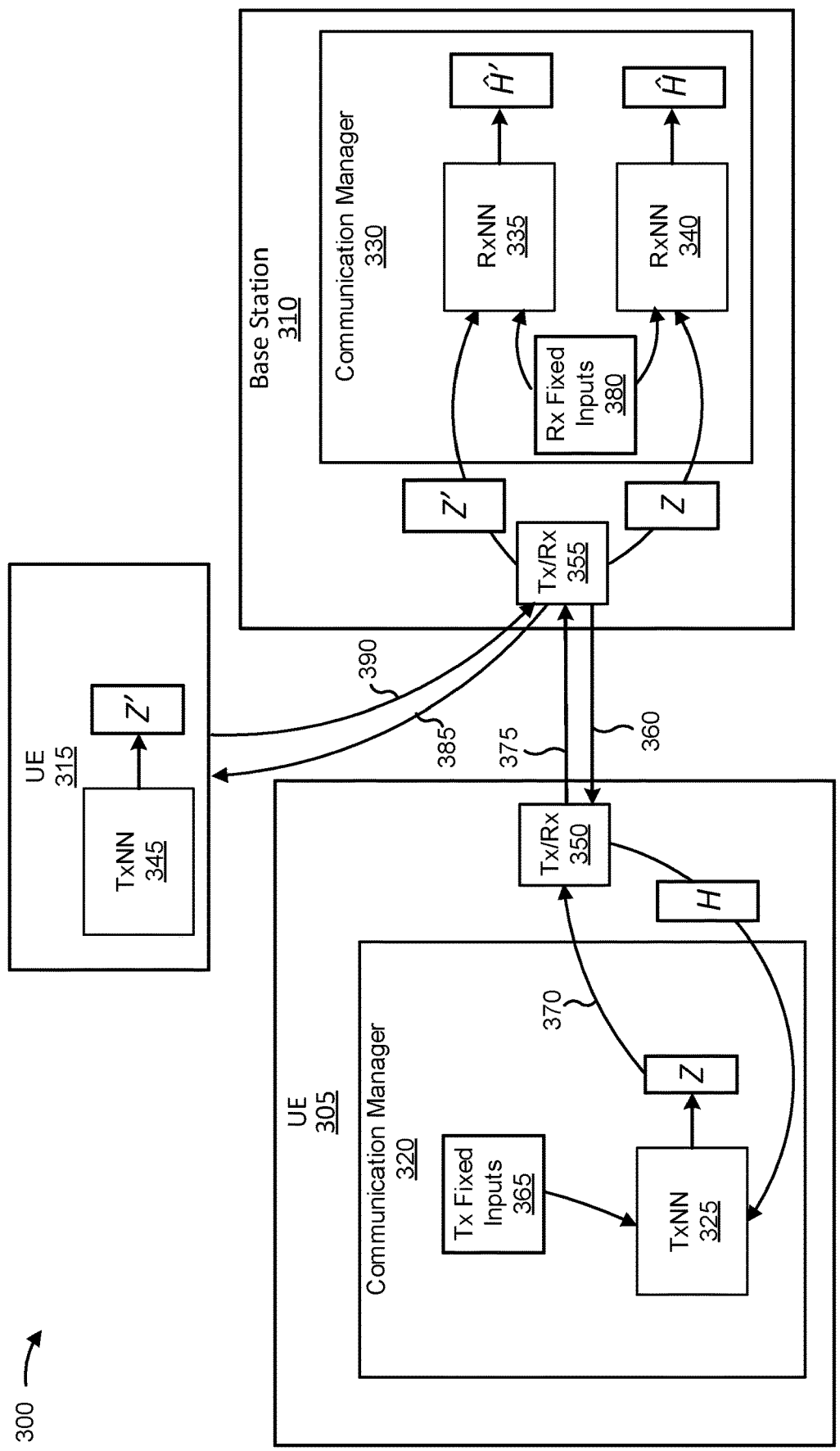
FIG. 3 is a diagram illustrating an example operating environment associated with transformer-based cross-node machine learning systems for wireless communication, in accordance with the present disclosure.

FIG. 3 is a diagram illustrating an example 300 operating environment associated with transformer-based cross-node machine learning systems for wireless communication, in accordance with the present disclosure. As shown, a UE 305 and a base station 310 may communicate with one another. As shown, an additional UE 315 may communicate with the base station 310 as well. In some aspects, any number of additional UEs not illustrated may be implemented in the context of the operating environment described herein. The UE 305 and/or the UE 315 may be, or be similar to, the UE 120 depicted in FIGS. 1 and 2. The base station 310 may be, or be similar to, the base station 110 depicted in FIGS. 1 and 2.

As shown, the UE 305 may include a communication manager 320 (e.g., the communication manager 140 shown in FIG. 1) that may be configured to utilize a transmitter neural network 325 to perform one or more computation operations. As shown in FIG. 3, the base station 310 may include a communication manager 330 (e.g., the communication manager 150) that may be configured to utilize one or more receiver neural networks 335 and 340 to perform one or more computation operations. In some aspects, the UE 315 may include a transmitter neural network 345 configured to perform one or more computation operations. For example, in some aspects, the transmitter neural network 325 and transmitter neural network 345 each may include a transformer backbone.

A transformer backbone is a transformer-based set of neural network layers that is shared across more than one UE. For example, the transmitter neural network 325 may include a first instance (e.g., which may be referred to, interchangeably, as a "copy" or an "instantiation") of a transformer backbone and the transmitter neural network 345 may include a second instance of the transformer backbone. The transformer backbone and, therefore, each instance thereof, may include one or more software components configured to be executed by one or more processors to perform one or more computation operations. In some aspects, the transmitter neural network 325 and/or the transmitter neural network 345 may be, be similar to, include, or be included in, the transmitter neural network 405 shown in FIG. 4 and described below. In some aspects, the receiver neural network 335 and/or the receiver neural network 340 may be, be similar to, include, or be included in, the receiver neural network 410 shown in FIG. 4 and described below.

As shown in FIG. 3, the UE 305 may include a transceiver (shown as "Tx/Rx") 350 that may facilitate wireless communications with a transceiver 355 of the base station 310. As shown by reference number 360, for example, the base station 310 may transmit, using the transceiver 355, a wireless communication to the UE 305. In some aspects, the wireless communication may include a reference signal such as a CSI reference signal (CSI-RS). The transceiver 350 of the UE 305 may receive the wireless communication. The communication manager 320 may determine an input token, H, based at least in part on the wireless communication. The input token H may be a vector. For example, in some aspects, the input token H may include a channel matrix corresponding to a tap of the channel impulse response, a channel matrix corresponding to a subcarrier, and/or a precoding matrix corresponding to a subcarrier, among other examples.

As shown, the first communication manager 320 may provide the input token H as input to the transmitter neural network 325. The communication manager 320 also may provide, as inputs, one or more transmitter (Tx) fixed inputs 365. The transmitter neural network 325 may determine a latent vector, Z, based at least in part on the input token H. As shown by reference number 370, the communication manager 320 may provide the latent vector Z to the transceiver 350 for transmission. As shown by reference number 375, the transceiver 350 may transmit, and the transceiver 355 of the base station 310 may receive, the latent vector Z. As shown, the communication manager 330 of the base station 310 may provide the latent vector Z as input to the receiver neural network 340. The communication manager 330 also may provide one or more Rx fixed inputs 380 as input to the receiver neural network 340. The receiver neural network 340 may determine (e.g., reconstruct) an estimated input token $\hat{H}$ based at least in part on the latent vector Z. In some aspects, the base station 310 may perform a wireless communication action based at least in part on the estimated input token $\hat{H}$.

As shown by reference number 385, the transceiver 355 of the base station 310 also may transmit a wireless communication signal to the additional UE 315. The additional UE 315 may use the transmitter neural network 345 to determine an additional latent vector, Z'. As shown by reference number 390, the additional UE 315 may transmit, and the transceiver 355 of the base station 310 may receive, the additional latent vector Z'. As shown, the communication manager 330 of the base station 310 may provide the additional latent vector Z' as input to the receiver neural network 335. The communication manager 330 also may provide one or more Rx fixed inputs 380 as input to the receiver neural network 335. The receiver neural network 335 may determine (e.g., reconstruct) an additional estimated input token $\hat{H}'$ based at least in part on the additional latent vector Z'. In some aspects, the communication manager 330 may utilize the estimated input token $\hat{H}$ and the additional estimated input token $\hat{H}'$ to perform further calculations and/or trigger wireless communication behaviors, among other examples. In some aspects, the combination of the transmitter neural network 325, the transmitter neural network 345, the receiver neural network 335 and the receiver neural network 340 may be referred to as a transformer-based cross-node machine learning system.

As indicated above, FIG. 3 is provided as an example. Other examples may differ from what is described with regard to FIG. 3. For example, in some aspects, the UE 305 and/or the additional UE 315 may determine any number of additional latent vectors and provide those latent vectors to the base station 310. For example, in some aspects, there will be other RxNN's that may determine the LOS/NLOS channel classification.

Figure 4:
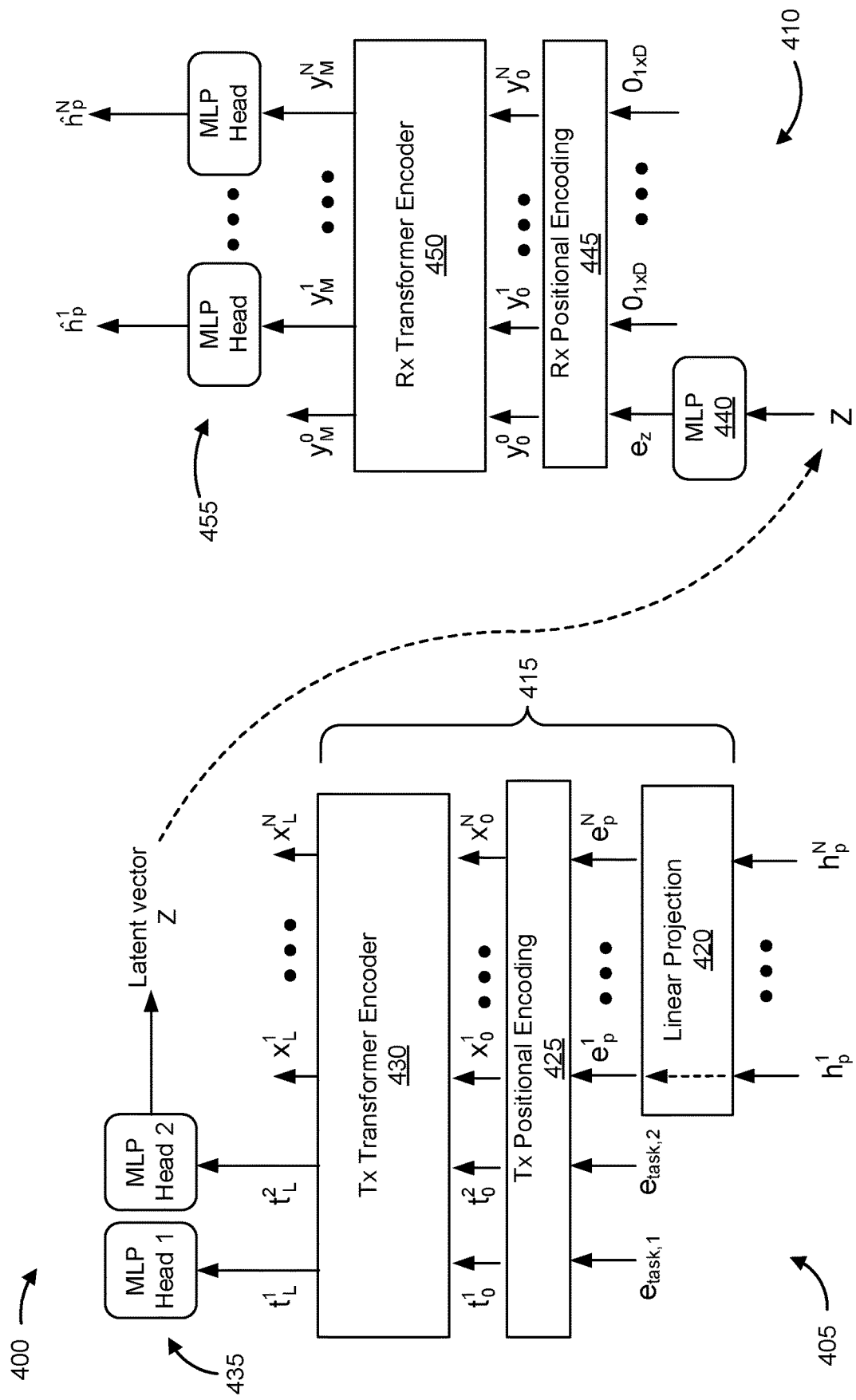
FIG. 4 is a diagram illustrating an example of a transformer-based cross-node machine learning system, in accordance with the present disclosure.

FIG. 4 is a diagram illustrating an example 400 of a transformer-based cross-node machine learning system, in accordance with the present disclosure. In some aspects, the transformer-based cross-node machine learning system shown in FIG. 4 may be, be similar to, include, or be included in the transformer-based cross-node machine learning system described in connection with FIG. 3 above.

As shown in FIG. 4, the transformer-based cross-node machine learning system may include a transmitter neural network 405 and a receiver neural network 410. The transmitter neural network 405 may be instantiated by a UE (e.g., UE 305 and/or UE 315) and the receiver neural network 410 may be instantiated by a base station (e.g., base station 310). As shown, the transmitter neural network 405 may include a transformer backbone instance 415 corresponding to the transformer-based cross-node machine learning system. The transformer backbone instance 415 may include a linear projection component 420 (shown as "Linear Projection")

that takes, as input, a set of input tokens $\{h_p^n\}_{n=1}^N$ and generates a set of linear token embeddings $\{e_p^n\}_{n=1}^N$ corresponding to the set of input tokens $\{h_p^n\}_{n=1}^N$, respectively. N denotes the number of input tokens. For example, as shown by the dashed arrow between the input arrow corresponding to the input token $h_p^1$ and the linear token embedding $e_p^1$, each input token is mapped to a respective linear token embedding.

In some aspects, as shown, the transformer backbone instance 415 also may include a transmitter positional encoding component 425 (shown as "Tx Positional Encoding") that takes, as input, the set of linear token embeddings $\{e_p^n\}_{n=1}^N$ and a set of task embedding vectors $\{e_{task,i}\}_{i=1}^T$. T denotes the number of tasks. In this example, T=2 is illustrated. Each task embedding vector $e_{task,i}$ of the set of task embedding vectors $\{e_{task,i}\}_{i=1}^T$ may correspond to one of the one or more computation tasks. The transmitter positional encoding component 425 may generate a set of token embedding vectors $\{x_0^n\}_{n=1}^N$ corresponding to the set of linear token embeddings $\{e_p^n\}_{n=1}^N$ and a set of position-encoded task embedding vectors $\{t_0^i\}_{n=1}^T$ corresponding to the set of task embedding vectors $\{e_{task,i}\}_{n=1}^T$.

As shown, the transformer backbone instance 415 also may include a transmitter transformer encoder 430 (shown as "Tx Transformer Encoder") that takes, as input, the set of token embedding vectors $\{x_0^n\}_{n=1}^N$ and the set of position-encoded task embedding vectors $\{t_0^i\}_{n=1}^T$. The transmitter transformer encoder 430 may generate a set of transformed token embedding vectors $\{x_L^n\}_{n=1}^N$ corresponding to the set of token embedding vectors $\{x_0^n\}_{n=1}^N$ and a set of transformed task embedding vectors $\{t_L^i\}_{i=1}^T$ corresponding to the set of position-encoded task embedding vectors $\{t_0^i\}_{i=1}^T$. In some aspects, $x_0^n$, $x_L^n$, and $e_p^n$ may be D-dimensional embedding vectors for the n-th input token $h_p^n$. $t_0^i$ and $t_L^i$ are the D-dimensional embedding vectors for the i-th task.

As shown by reference number 435, the transmitter neural network may include one or more layers of at least one head module instance (shown as "MLP Head 1" and "MLP Head 2") corresponding to the one or more computation tasks. The latent vector Z may include an output of the one or more layers of the head module instance. The head module instance takes, as input, a transformed task embedding vector $t_L^i$ generated by the transmitter transformer encoder. In some aspects, the input to the Tx transformer encoder 430 may be formed by:

$$x_0 = [e_{task,1}; e_{task,2}; \ldots; e_{task,T}; h_p^1 E; h_p^2 E; \ldots; h_p^N E] E_{pos},$$

where $e_{task,i}$ is a learnable embedding vector corresponding to the token intended for the i-th task, $h_n^p$ is the n-th input token (n=1, 2, ..., N), E is a trainable linear projection matrix common to all the input tokens, $e_p^n = h_p^n E$ is a linear embedding of $h_p^n$, and $E_{pos}$ is a (N+T)×D position embedding matrix that may be trained. IN some aspects, the base station may indicate a task index (e.g., where the task index is 2 in the illustrated example). The transformed task embedding vector corresponding to the task token $t_L^2$ is provided to an MLP head, which computes the lower dimensional latent vector Z for this task 2. The latent vector Z may be quantized and reported to the base station. In some aspects, $\{e_{task,i}\}i=i^T$, E, and $E_{pos}$ may be trained during a training phase, and once the neural network is trained, they may be fixed. Thus, during inference (deployment), the only inputs that change are the input tokens $h_p^n$.

As shown in FIG. 4, the receiver neural network 410 may include a mapping head module instance 440 (shown as "MLP") corresponding to the computation task. The mapping head module instance 440 maps the latent vector Z to a mapped embedding vector $e_z$. The mapped embedding vector $e_z$ may be a 1×D embedding vector. The receiver neural network 410 also includes a receiver positional encoding component 445 (shown as "Rx Positional Encoding") that takes, as input, the mapped embedding vector $e_z$ and a set of zero vectors $\{0_{1×D}, 0_{1×D}, \ldots, 0_{1×D}\}$. The receiver positional encoding component 445 may generate a set of token queries $\{y_0^n\}_{n=1}^N$ corresponding to the set of zero vectors $\{0_{1×D}, 0_{1×D}, \ldots, 0_{1×D}\}$ and a position-encoded mapped embedding vector $y_0^0$ corresponding to the mapped embedding vector $e_z$.

As shown in FIG. 4, the receiver neural network 410 includes a receiver transformer encoder 450 (shown as "Rx Transformer Encoder") that takes, as input, the set of token queries $\{y_0^n\}_{n=1}^N$ and the position-encoded mapped embedding vector $y_0^0$. The receiver transformer encoder 450 generates a set of unpacked token vectors $\{y_M^n\}_{n=1}^N$ corresponding to the set of token queries $\{y_0^n\}_{n=1}^N$. In some aspects, the input to the receiver transformer encoder 450 is formed by $$y_0 = [e_z; 0_{1×D}; 0_{1×D}; \ldots; 0_{1×D}] + Q_{pos},$$

where $Q_{pos}$ is a (N+1)×D position embedding matrix that may be trained. Essentially, the receiver transformer encoder 450 iteratively unpacks the information about $\{h_p^n\}_{n=1}^N$ that is stored in the latent vector Z into $\{y_M^n\}_{n=1}^N$. As shown by reference number 455, the receiver neural network 410 also includes a set of estimation head modules that take, as input, the set of unpacked token vectors $\{y_M^n\}_{n=1}^M$. Each estimation head module of the set of estimation head modules generates an estimated input token $\hat{h}_p^n$.

As indicated above, FIG. 4 is provided as an example. Other examples may differ from what is described with regard to FIG. 4. For example, each of the transmitter transformer encoder 430 and the receiver transformer encoder 450 may include any number of transformer encoder layers configured to iterate the transformation of the embedding vectors any number of times. In FIG. 4, L denotes the number of transformer encoder layers in the transmitter transformer encoder 430, and M denotes the number of transformer encoder layers in the receiver transformer encoder 450. In another example, the receiver neural network may be MLP or CNN that perform other tasks such as LOS/NLOS channel classification.

Figure 5:
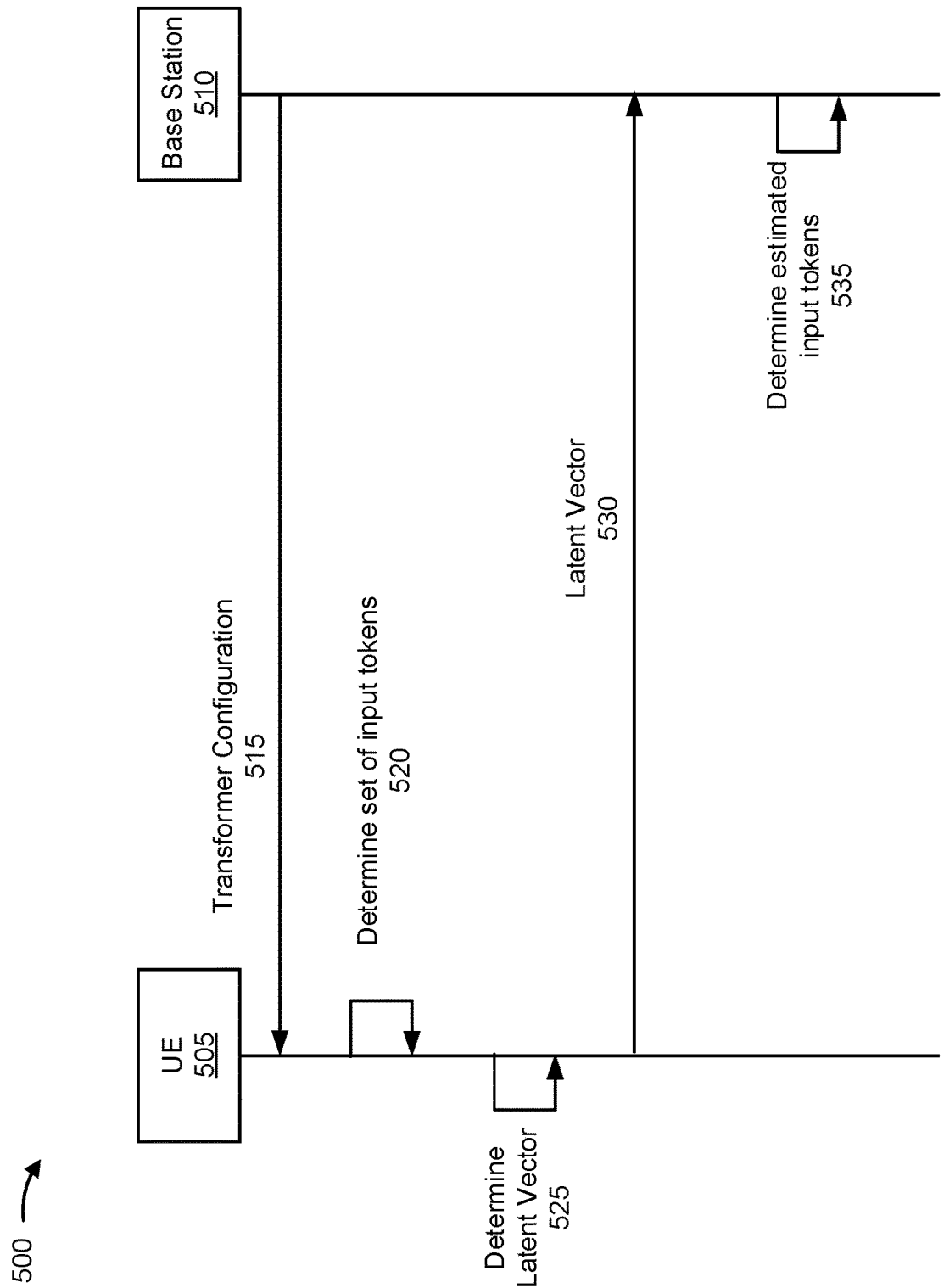
FIG. 5 is a diagram illustrating an example call flow associated with transformer-based cross-node machine learning systems for wireless communication, in accordance with the present disclosure.

FIG. 5 is a diagram illustrating an example 500 of a call flow associated with transformer-based cross-node machine learning systems for wireless communication, in accordance with the present disclosure. As shown, a UE 505 and a base station 510 may communicate with one another. The UE 505 may be, or be similar to, the UE 305 and/or the UE 315 depicted in FIG. 3. The base station 510 may be, or be similar to, the base station 310 depicted in FIG. 3.

As shown by reference number 515, the base station 510 may transmit, and the UE 505 may receive, a transformer configuration. In some aspects, the base station 510 may transmit the transformer configuration by transmitting an upper-layer communication including the transformer configuration. In some aspects, the upper-layer communication may include a radio resource control (RRC) message.

In some aspects, the transformer configuration may include a transmitter neural network (e.g., the transmitter neural network 405 depicted in FIG. 4) configured to be used to generate at least one latent vector corresponding to one or more computation tasks of a plurality of computation tasks associated with a transformer-based cross-node machine learning system. In some aspects, for example, the transformer-based cross-node machine learning system may include the transmitter neural network instantiated by the UE 505 and a plurality of receiver neural networks instantiated by the base station 510. Each receiver neural network of the plurality of receiver neural networks may correspond to a computation task of the plurality of computation tasks. In some aspects, the transformer configuration may indicate at least one of a set of transmitter transformer encoder parameters, a position embedding matrix, a linear projection matrix, a set of task embedding vectors, an indication of an ordering of the set of task embedding vectors and a set of linear token embeddings, or a set of head component parameters.

In some aspects, the UE 505 may be configured to periodically report latent vectors to the base station 510. For example, the transformer configuration may indicate a reporting configuration and the UE 505 may transmit the at least one latent vector based at least in part on the reporting configuration. In some aspects, the reporting configuration may include at least one of an indication of a reporting period, an indication of a reporting offset time, or an indication of a task-based reporting scheme. In some aspects, for example, the base station 510 may transmit a downlink control information (DCI) transmission to the UE 505 that includes an indication to report the at least one latent vector and the UE 505 may report the at least one latent vector based at least in part on receiving the DCI transmission.

As shown by reference number 520, the UE 505 may determine a set of input tokens and, as shown by reference number 525, the UE 505 may determine a latent vector. In some aspects, for example, the UE 505 may determine the input tokens and the latent vector as described above in connection with FIG. 4. As shown by reference number 530, the UE 505 may transmit, and the base station 510 may receive, the latent vector. As shown by reference number 535, the base station 510 may determine a set of estimated input tokens based at least in part on the latent vector. In some aspects, the base station 510 may determine the set of estimated input tokens as described above in connection with FIG. 4.

As indicated above, FIG. 5 is provided as an example. Other examples may differ from what is described with regard to FIG. 5. For example, in some aspects, the base station 510 may transmit additional instances of the transformer configuration to one or more additional UEs and may receive additional latent vectors from the one or more additional UEs.

Figure 6:
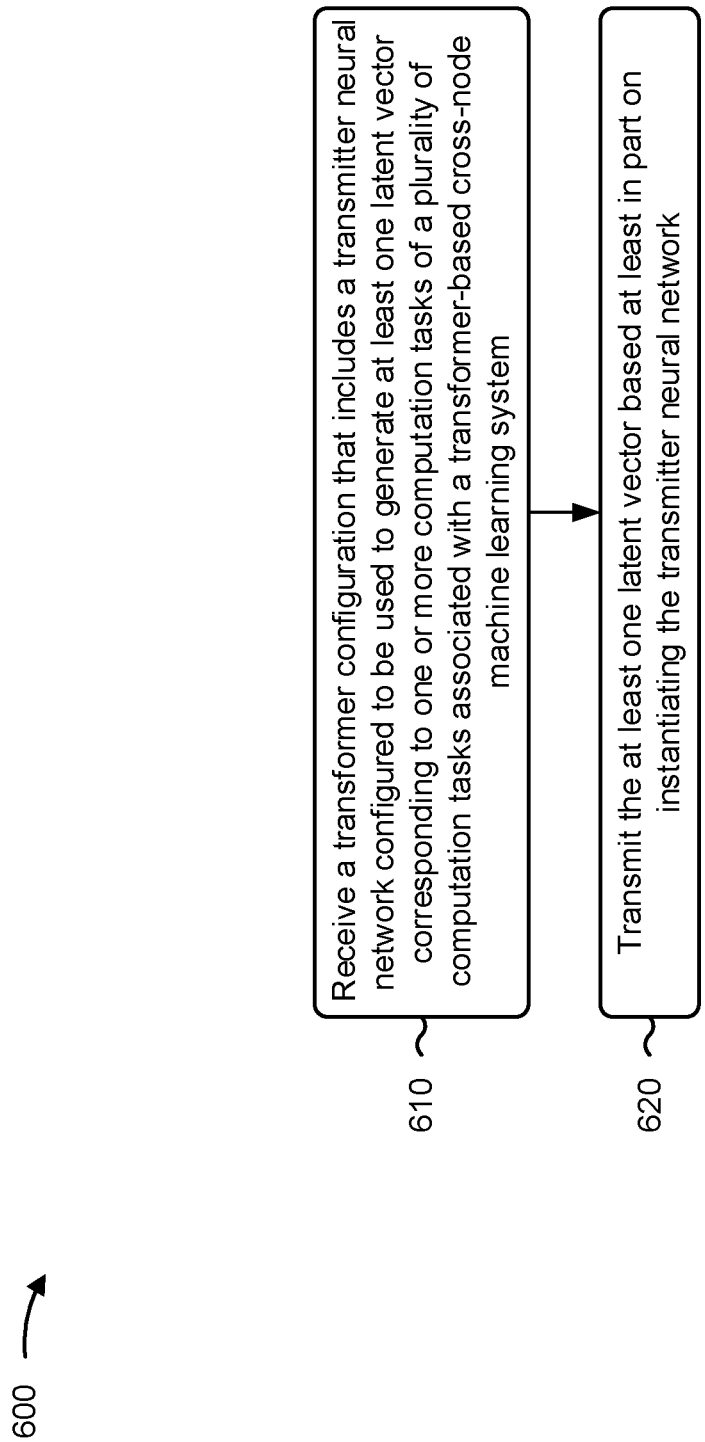
FIGS. 6 and 7 are diagrams illustrating example processes associated with transformer-based cross-node machine learning systems for wireless communication, in accordance with the present disclosure.

FIG. 6 is a diagram illustrating an example process 600 performed (for example, by a UE), in accordance with the present disclosure. Example process 600 is an example where the UE (e.g., UE 505) performs operations associated with transformer-based cross-node machine learning systems for wireless communication.

As shown in FIG. 6, in some aspects, process 600 may include receiving a transformer configuration that includes a transmitter neural network configured to be used to generate at least one latent vector corresponding to one or more computation tasks of a plurality of computation tasks associated with a transformer-based cross-node machine learning system (block 610). For example, the UE (e.g., using communication manager 140 and/or reception component 802, depicted in FIG. 8) may receive a transformer configuration that includes a transmitter neural network configured to be used to generate at least one latent vector corresponding to one or more computation tasks of a plurality of computation tasks associated with a transformer-based cross-node machine learning system, as described above.

As further shown in FIG. 6, in some aspects, process 600 may include transmitting the at least one latent vector based at least in part on instantiating the transmitter neural network (block 620). For example, the UE (e.g., using communication manager 140 and/or transmission component 804, depicted in FIG. 8) may transmit the at least one latent vector based at least in part on instantiating the transmitter neural network, as described above.

Process 600 may include additional aspects, such as any single aspect or any combination of aspects described below and/or in connection with one or more other processes described elsewhere herein.

In a first aspect, the transformer-based cross-node machine learning system comprises the transmitter neural network instantiated by the UE and a plurality of receiver neural networks instantiated by a base station, wherein each receiver neural network of the plurality of receiver neural networks corresponds to a computation task of the plurality of computation tasks.

In a second aspect, alone or in combination with the first aspect, the transmitter neural network comprises a transformer backbone instance corresponding to the transformer-based cross-node machine learning system. In a third aspect, alone or in combination with the second aspect, the transformer backbone instance comprises a linear projection component that takes, as input, a set of input tokens and generates a set of linear token embeddings corresponding to the set of input tokens, respectively, a transmitter positional encoding component that takes, as input, the set of linear token embeddings and a set of task embedding vectors, wherein each task embedding vector of the set of task embedding vectors corresponds to one of the one or more computation tasks, and wherein the transmitter positional encoding component generates a set of token embedding vectors corresponding to the set of linear token embeddings and a set of position-encoded task embedding vectors corresponding to the set of task embedding vectors, and a transmitter transformer encoder that takes, as input, the set of token embedding vectors and the set of position-encoded task embedding vectors, wherein the transmitter transformer encoder generates a set of transformed token embedding vectors corresponding to the set of token embedding vectors and a set of transformed task embedding vectors corresponding to the set of position-encoded task embedding vectors.

In a fourth aspect, alone or in combination with one or more of the first through third aspects, the transmitter neural network comprises one or more layers of at least one head module instance corresponding to the one or more computation tasks. In a fifth aspect, alone or in combination with one or more of the first through fourth aspects, the latent vector comprises an output of one or more layers of a head module instance corresponding to a computation task of the one or more computation tasks, wherein the head module instance takes, as input, a transformed task embedding vector generated by a transmitter transformer encoder. In a sixth aspect, alone or in combination with one or more of the first through fifth aspects, receiving the transformer configuration comprises receiving an upper-layer communication including the transformer configuration. In a seventh aspect, alone or in combination with one or more of the first through sixth aspects, the upper-layer communication comprises an RRC message.

In an eighth aspect, alone or in combination with one or more of the first through seventh aspects, the transformer configuration indicates at least one of a set of transmitter transformer encoder parameters, a position embedding matrix, a linear projection matrix, a set of task embedding vectors, an indication of an ordering of the set of task embedding vectors and a set of linear token embeddings, or a set of head component parameters. In a ninth aspect, alone or in combination with one or more of the first through eighth aspects, the transformer configuration indicates a reporting configuration, and wherein transmitting the at least one latent vector comprises transmitting the at least one latent vector based at least in part on the reporting configuration. In a tenth aspect, alone or in combination with the ninth aspect, the reporting configuration comprises at least one of an indication of a reporting period, an indication of a reporting offset time, or an indication of a task-based reporting scheme.

In an eleventh aspect, alone or in combination with one or more of the first through tenth aspects, process 600 includes receiving a DCI transmission that includes an indication to report the at least one latent vector, wherein transmitting the at least one latent vector comprises transmitting the at least one latent vector based at least in part on receiving the DCI transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
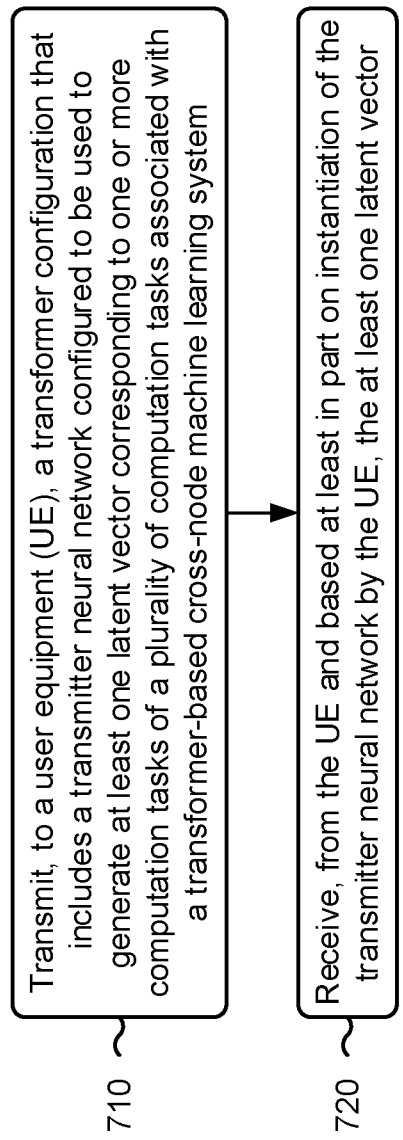

FIG. 7 is a diagram illustrating an example process 700 performed, for example, by a base station, in accordance with the present disclosure. Example process 700 is an example where the base station (e.g., base station 510) performs operations associated with transformer-based cross-node machine learning systems for wireless communication.

As shown in FIG. 7, in some aspects, process 700 may include transmitting, to a UE, a transformer configuration that includes a transmitter neural network configured to be used to generate at least one latent vector corresponding to one or more computation tasks of a plurality of computation tasks associated with a transformer-based cross-node machine learning system (block 710). For example, the base station (e.g., using communication manager 150 and/or transmission component 904, depicted in FIG. 9) may transmit, to a UE, a transformer configuration that includes a transmitter neural network configured to be used to generate at least one latent vector corresponding to one or more computation tasks of a plurality of computation tasks associated with a transformer-based cross-node machine learning system, as described above.

As further shown in FIG. 7, in some aspects, process 700 may include receiving, from the UE and based at least in part on instantiation of the transmitter neural network by the UE, the at least one latent vector (block 720). For example, the base station (e.g., using communication manager 150 and/or reception component 902, depicted in FIG. 9) may receive, from the UE and based at least in part on instantiation of the transmitter neural network by the UE, the at least one latent vector, as described above.

Process 700 may include additional aspects, such as any single aspect or any combination of aspects described below and/or in connection with one or more other processes described elsewhere herein.

In a first aspect, process 700 includes transmitting, to at least one additional UE, at least one additional transformer configuration that includes at least one additional transmitter neural network configured to be used to generate at least one additional latent vector corresponding to one or more additional computation tasks of the plurality of computation tasks associated with the transformer-based cross-node machine learning system, and receiving, from the at least one additional UE, the at least one additional latent vector.

In a second aspect, alone or in combination with the first aspect, the transformer-based cross-node machine learning system comprises the transmitter neural network instantiated by the UE and a receiver neural network instantiated by the base station. In a third aspect, alone or in combination with one or more of the first and second aspects, the transformer-based cross-node machine learning system comprises the transmitter neural network instantiated by the UE and a plurality of receiver neural networks instantiated by the base station, wherein each receiver neural network of the plurality of receiver neural networks corresponds to a computation task of the plurality of computation tasks. In a fourth aspect, alone or in combination with the third aspect, the transformer-based cross-node machine learning system further comprises at least one additional transmitter neural network instantiated by at least one additional UE.

In a fifth aspect, alone or in combination with one or more of the third through fourth aspects, the transmitter neural network comprises one or more layers of a transmitter instance of a head module corresponding to a computation task of the one or more computation tasks, and wherein a receiver neural network of the plurality of receiver neural networks comprises one or more additional layers of a receiver instance of the head module.

In a sixth aspect, alone or in combination with one or more of the first through fifth aspects, process 700 includes providing the latent vector as input to a receiver neural network corresponding to a computation task of the plurality of computation tasks. In a seventh aspect, alone or in combination with the sixth aspect, the receiver neural network comprises a mapping head module instance corresponding to the computation task, wherein the mapping head module instance maps the latent vector to a mapped embedding vector, a receiver positional encoding component that takes, as input, the mapped embedding vector and a set of zero vectors, and wherein the receiver positional encoding component generates a set of token queries corresponding to the set of zero vectors and a position-encoded mapped embedding vector corresponding to the mapped embedding vector, a receiver transformer encoder that takes, as input, the set of token queries and the position-encoded mapped embedding vector, wherein the receiver transformer encoder generates a set of unpacked token vectors corresponding to the set of token queries, and a set of estimation head modules that take, as input, the set of unpacked token vectors, wherein each estimation head module of the set of estimation head modules generates an estimated input token.

In an eighth aspect, alone or in combination with one or more of the first through seventh aspects, the at least one latent vector comprises an output of one or more layers of a head module instance corresponding to a computation task of the one or more computation tasks. In a ninth aspect, alone or in combination with one or more of the first through eighth aspects, transmitting the transformer configuration comprises transmitting an upper-layer communication including the transformer configuration. In a tenth aspect, alone or in combination with the ninth aspect, the upper-layer communication comprises a radio resource control message.

In an eleventh aspect, alone or in combination with one or more of the first through tenth aspects, the transformer configuration indicates at least one of a set of transmitter transformer encoder parameters, a position embedding matrix, a linear projection matrix, a set of task embedding vectors, an indication of an ordering of the set of task embedding vectors and a set of linear token embeddings, or a set of head component parameters. In a twelfth aspect, alone or in combination with one or more of the first through eleventh aspects, the transformer configuration indicates a reporting configuration, and wherein receiving the at least one latent vector comprises receiving the at least one latent vector based at least in part on the reporting configuration. In a thirteenth aspect, alone or in combination with the twelfth aspect, the reporting configuration comprises at least one of an indication of a reporting period, an indication of a reporting offset time, or an indication of a task-based reporting scheme.

In a fourteenth aspect, alone or in combination with one or more of the first through thirteenth aspects, process 700 includes transmitting a DCI transmission that includes an indication to report the at least one latent vector, wherein receiving the at least one latent vector comprises receiving the at least one latent vector based at least in part on transmitting the DCI transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
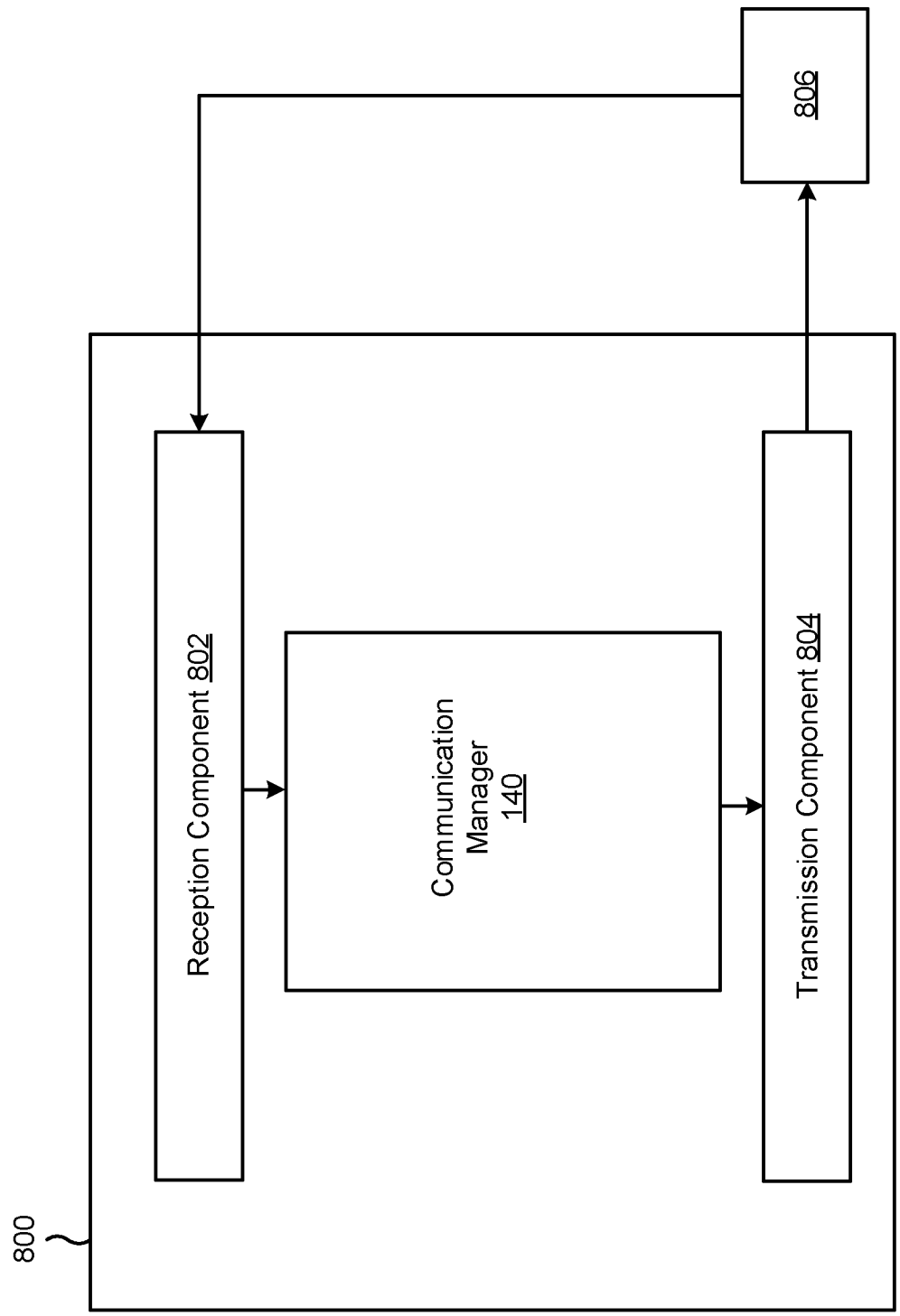
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a transformer configuration that includes a transmitter neural network configured to be used to generate at least one latent vector corresponding to one or more computation tasks of a plurality of computation tasks associated with a transformer-based cross-node machine learning system. The reception component 802 may receive a DCI transmission that includes an indication to report the at least one latent vector, wherein transmitting the at least one latent vector comprises transmitting the at least one latent vector based at least in part on receiving the DCI transmission. The communication manager 140 may determine the at least one latent vector and the transmission component 804 may transmit the at least one latent vector based at least in part on instantiating the transmitter neural network. In some aspects, the communication manager 140 may include one or more antennas, a modem, a modulator, a controller/processor, a memory, or a combination thereof, of the UE described in connection with FIG. 2. In some aspects, the communication manager 140 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
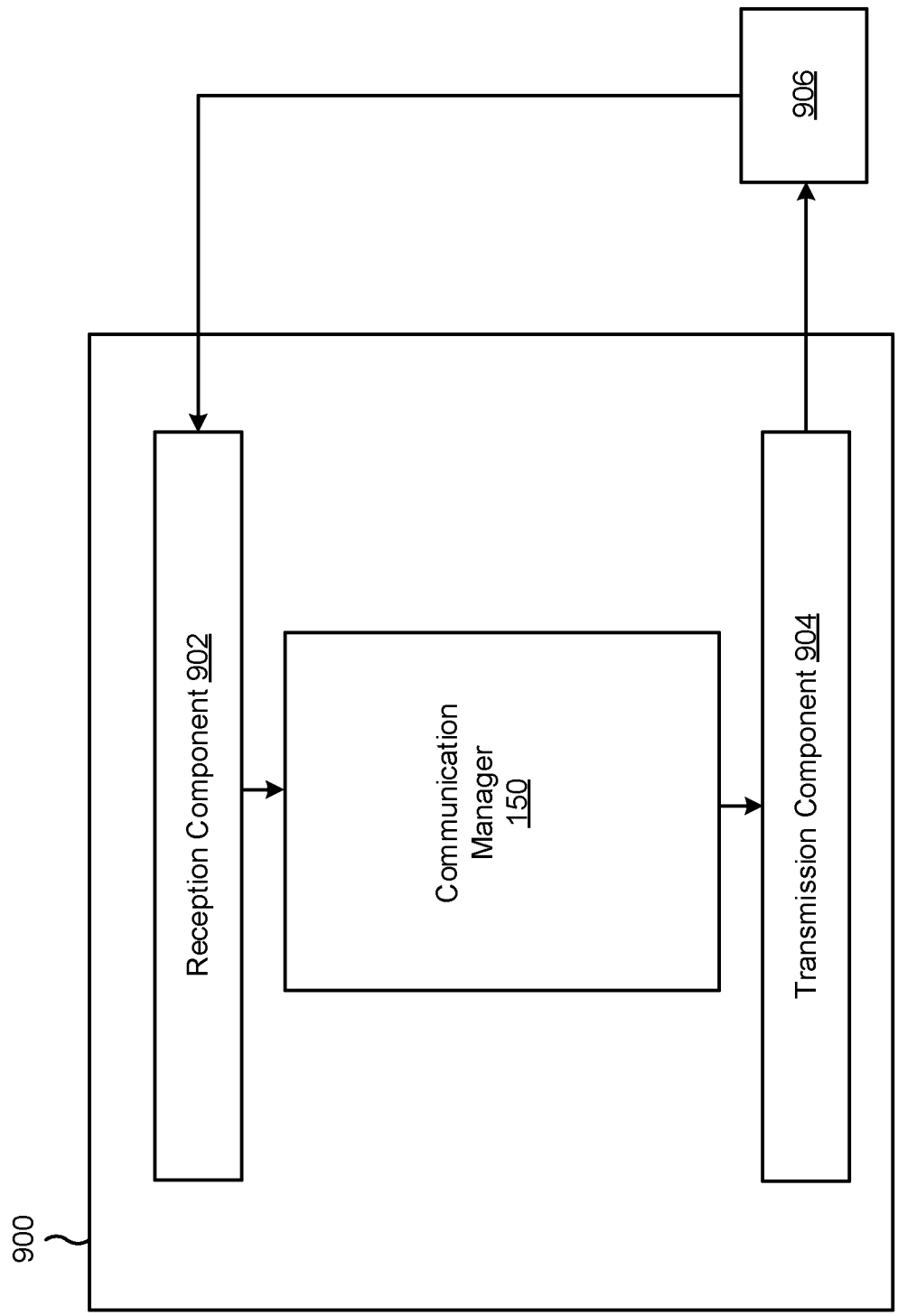

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, a transformer configuration that includes a transmitter neural network configured to be used to generate at least one latent vector corresponding to one or more computation tasks of a plurality of computation tasks associated with a transformer-based cross-node machine learning system. The reception component 902 may receive, from the UE and based at least in part on instantiation of the transmitter neural network by the UE, the at least one latent vector.

The transmission component 904 may transmit, to at least one additional UE, at least one additional transformer configuration that includes at least one additional transmitter neural network configured to be used to generate at least one additional latent vector corresponding to one or more additional computation tasks of the plurality of computation tasks associated with the transformer-based cross-node machine learning system. The reception component 902 may receive, from the at least one additional UE, the at least one additional latent vector.

The communication manager 150 may provide the latent vector as input to a receiver neural network corresponding to a computation task of the plurality of computation tasks. In some aspects, the communication manager 150 may include one or more antennas, a modem, a modulator, a controller/processor, a memory, or a combination thereof, of the base station described in connection with FIG. 2. In some aspects, the communication manager 150 may include the reception component 902 and/or the transmission component 904.

The transmission component 904 may transmit a DCI transmission that includes an indication to report the at least one latent vector, wherein receiving the at least one latent vector comprises receiving the at least one latent vector based at least in part on transmitting the DCI transmission.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a transformer configuration that includes a transmitter neural network configured to be used to generate at least one latent vector corresponding to one or more computation tasks of a plurality of computation tasks associated with a transformer-based cross-node machine learning system; and transmitting the at least one latent vector based at least in part on instantiating the transmitter neural network.

Aspect 2: The method of Aspect 1, wherein the transformer-based cross-node machine learning system comprises the transmitter neural network instantiated by the UE and a plurality of receiver neural networks instantiated by a base station, wherein each receiver neural network of the plurality of receiver neural networks corresponds to a computation task of the plurality of computation tasks.

Aspect 3: The method of either of Aspects 1 or 2, wherein the transmitter neural network comprises a transformer backbone instance corresponding to the transformer-based cross-node machine learning system.

Aspect 4: The method of Aspect 3, wherein the transformer backbone instance comprises: a linear projection component that takes, as input, a set of input tokens and generates a set of linear token embeddings corresponding to the set of input tokens, respectively; a transmitter positional encoding component that takes, as input, the set of linear token embeddings and a set of task embedding vectors, wherein each task embedding vector of the set of task embedding vectors corresponds to one of the one or more computation tasks, and wherein the transmitter positional encoding component generates a set of token embedding vectors corresponding to the set of linear token embeddings and a set of position-encoded task embedding vectors corresponding to the set of task embedding vectors; and a transmitter transformer encoder that takes, as input, the set of token embedding vectors and the set of position-encoded task embedding vectors, wherein the transmitter transformer encoder generates a set of transformed token embedding vectors corresponding to the set of token embedding vectors and a set of transformed task embedding vectors corresponding to the set of position-encoded task embedding vectors.

Aspect 5: The method of any of Aspects 1-4, wherein the transmitter neural network comprises one or more layers of at least one head module instance corresponding to the one or more computation tasks.

Aspect 6: The method of any of Aspects 1-5, wherein the latent vector comprises an output of one or more layers of a head module instance corresponding to a computation task of the one or more computation tasks, wherein the head module instance takes, as input, a transformed task embedding vector generated by a transmitter transformer encoder.

Aspect 7: The method of any of Aspects 1-6, wherein receiving the transformer configuration comprises receiving an upper-layer communication including the transformer configuration.

Aspect 8: The method of Aspect 7, wherein the upper-layer communication comprises a radio resource control message.

Aspect 9: The method of any of Aspects 1-8, wherein the transformer configuration indicates at least one of: a set of transmitter transformer encoder parameters, a position embedding matrix, a linear projection matrix, a set of task embedding vectors, an indication of an ordering of the set of task embedding vectors and a set of linear token embeddings, or a set of head component parameters.

Aspect 10: The method of any of Aspects 1-9, wherein the transformer configuration indicates a reporting configuration, and wherein transmitting the at least one latent vector comprises transmitting the at least one latent vector based at least in part on the reporting configuration.

Aspect 11: The method of Aspect 10, wherein the reporting configuration comprises at least one of: an indication of a reporting period, an indication of a reporting offset time, or an indication of a task-based reporting scheme.

Aspect 12: The method of any of Aspects 1-11, further comprising receiving a downlink control information (DCI) transmission that includes an indication to report the at least one latent vector, wherein transmitting the at least one latent vector comprises transmitting the at least one latent vector based at least in part on receiving the DCI transmission.

Aspect 13: A method of wireless communication performed by a base station, comprising: transmitting, to a user equipment (UE), a transformer configuration that includes a transmitter neural network configured to be used to generate at least one latent vector corresponding to one or more computation tasks of a plurality of computation tasks associated with a transformer-based cross-node machine learning system; and receiving, from the UE and based at least in part on instantiation of the transmitter neural network by the UE, the at least one latent vector.

Aspect 14: The method of Aspect 13, further comprising: transmitting, to at least one additional UE, at least one additional transformer configuration that includes at least one additional transmitter neural network configured to be used to generate at least one additional latent vector corresponding to one or more additional computation tasks of the plurality of computation tasks associated with the transformer-based cross-node machine learning system; and receiving, from the at least one additional UE, the at least one additional latent vector.

Aspect 15: The method of Aspect 13, wherein the transformer-based cross-node machine learning system comprises the transmitter neural network instantiated by the UE and a receiver neural network instantiated by the base station.

Aspect 16: The method of either of Aspects 13 or 14, wherein the transformer-based cross-node machine learning system comprises the transmitter neural network instantiated by the UE and a plurality of receiver neural networks instantiated by the base station, wherein each receiver neural network of the plurality of receiver neural networks corresponds to a computation task of the plurality of computation tasks.

Aspect 17: The method of Aspect 16, wherein the transformer-based cross-node machine learning system further comprises at least one additional transmitter neural network instantiated by at least one additional UE.

Aspect 18: The method of either of Aspects 16 or 17, wherein the transmitter neural network comprises one or more layers of a transmitter instance of a head module corresponding to a computation task of the one or more computation tasks, and wherein a receiver neural network of the plurality of receiver neural networks comprises one or more additional layers of a receiver instance of the head module.

Aspect 19: The method of any of Aspects 13-18, further comprising providing the latent vector as input to a receiver neural network corresponding to a computation task of the plurality of computation tasks.

Aspect 20: The method of Aspect 19, wherein the receiver neural network comprises: a mapping head module instance corresponding to the computation task, wherein the mapping head module instance maps the latent vector to a mapped embedding vector; a receiver positional encoding component that takes, as input, the mapped embedding vector and a set of zero vectors, and wherein the receiver positional encoding component generates a set of token queries corresponding to the set of zero vectors and a position-encoded mapped embedding vector corresponding to the mapped embedding vector; a receiver transformer encoder that takes, as input, the set of token queries and the position-encoded mapped embedding vector, wherein the receiver transformer encoder generates a set of unpacked token vectors corresponding to the set of token queries; and a set of estimation head modules that take, as input, the set of unpacked token vectors, wherein each estimation head module of the set of estimation head modules generates an estimated input token.

Aspect 21: The method of any of Aspects 13-20, wherein the at least one latent vector comprises an output of one or more layers of a head module instance corresponding to a computation task of the one or more computation tasks.

Aspect 22: The method of any of Aspects 13-21, wherein transmitting the transformer configuration comprises transmitting an upper-layer communication including the transformer configuration.

Aspect 23: The method of Aspect 22, wherein the upper-layer communication comprises a radio resource control message.

Aspect 24: The method of any of Aspects 13-23, wherein the transformer configuration indicates at least one of: a set of transmitter transformer encoder parameters, a position embedding matrix, a linear projection matrix, a set of task embedding vectors, an indication of an ordering of the set of task embedding vectors and a set of linear token embeddings, or a set of head component parameters.

Aspect 25: The method of any of Aspects 13-24, wherein the transformer configuration indicates a reporting configuration, and wherein receiving the at least one latent vector comprises receiving the at least one latent vector based at least in part on the reporting configuration.

Aspect 26: The method of Aspect 25, wherein the reporting configuration comprises at least one of: an indication of a reporting period, an indication of a reporting offset time, or an indication of a task-based reporting scheme.

Aspect 27: The method of any of Aspects 13-26, further comprising transmitting a downlink control information (DCI) transmission that includes an indication to report the at least one latent vector, wherein receiving the at least one latent vector comprises receiving the at least one latent vector based at least in part on transmitting the DCI transmission.

Aspect 28: An apparatus for wireless communication at a device, comprising a processor; memory coupled with the processor; and instructions stored in the memory and executable by the processor to cause the apparatus to perform the method of one or more of Aspects 1-12.

Aspect 29: A device for wireless communication, comprising a memory and one or more processors coupled to the memory, the one or more processors configured to perform the method of one or more of Aspects 1-12.

Aspect 30: An apparatus for wireless communication, comprising at least one means for performing the method of one or more of Aspects 1-12.

Aspect 31: A non-transitory computer-readable medium storing code for wireless communication, the code comprising instructions executable by a processor to perform the method of one or more of Aspects 1-12.

Aspect 32: A non-transitory computer-readable medium storing a set of instructions for wireless communication, the set of instructions comprising one or more instructions that, when executed by one or more processors of a device, cause the device to perform the method of one or more of Aspects 1-12.

Aspect 33: An apparatus for wireless communication at a device, comprising a processor; memory coupled with the processor; and instructions stored in the memory and executable by the processor to cause the apparatus to perform the method of one or more of Aspects 13-27.

Aspect 34: A device for wireless communication, comprising a memory and one or more processors coupled to the memory, the one or more processors configured to perform the method of one or more of Aspects 13-27.

Aspect 35: An apparatus for wireless communication, comprising at least one means for performing the method of one or more of Aspects 13-27.

Aspect 0.36: A non-transitory computer-readable medium storing code for wireless communication, the code comprising instructions executable by a processor to perform the method of one or more of Aspects 13-27.

Aspect 37: A non-transitory computer-readable medium storing a set of instructions for wireless communication, the set of instructions comprising one or more instructions that, when executed by one or more processors of a device, cause the device to perform the method of one or more of Aspects 13-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a transformer configuration that includes a transmitter neural network configured to be used to generate at least one latent vector corresponding to one or more computation tasks of a plurality of computation tasks associated with a transformer-based cross-node machine learning system, wherein the transformer-based cross-node machine learning system comprises the transmitter neural network instantiated by the UE; and
transmit the at least one latent vector based at least in part on instantiating the transmitter neural network.

2. The UE of claim 1, wherein the transformer-based cross-node machine learning system further comprises a plurality of receiver neural networks instantiated by a base station, wherein each receiver neural network of the plurality of receiver neural networks corresponds to a computation task of the plurality of computation tasks.

3. The UE of claim 1, wherein the transmitter neural network comprises a transformer backbone instance corresponding to the transformer-based cross-node machine learning system.

4. The UE of claim 3, wherein the transformer backbone instance comprises:
a linear projection component that takes, as input, a set of input tokens and generates a set of linear token embeddings corresponding to the set of input tokens, respectively;
a transmitter positional encoding component that takes, as input, the set of linear token embeddings and a set of task embedding vectors, wherein each task embedding vector of the set of task embedding vectors corresponds to one of the one or more computation tasks, and wherein the transmitter positional encoding component generates a set of token embedding vectors corresponding to the set of linear token embeddings and a set of position-encoded task embedding vectors corresponding to the set of task embedding vectors; and
a transmitter transformer encoder that takes, as input, the set of token embedding vectors and the set of position-encoded task embedding vectors, wherein the transmitter transformer encoder generates a set of transformed token embedding vectors corresponding to the set of token embedding vectors and a set of transformed task embedding vectors corresponding to the set of position-encoded task embedding vectors.

5. The UE of claim 1, wherein the transmitter neural network comprises one or more layers of at least one head module instance corresponding to the one or more computation tasks.

6. The UE of claim 1, wherein the latent vector comprises an output of one or more layers of a head module instance corresponding to a computation task of the one or more computation tasks, wherein the head module instance takes, as input, a transformed task embedding vector generated by a transmitter transformer encoder.

7. The UE of claim 1, wherein the one or more processors, to receive the transformer configuration, are configured to receive an upper-layer communication including the transformer configuration.

8. The UE of claim 7, wherein the upper-layer communication comprises a radio resource control message.

9. The UE of claim 1, wherein the transformer configuration indicates at least one of:
a set of transmitter transformer encoder parameters,
a position embedding matrix,
a linear projection matrix,
a set of task embedding vectors,
an indication of an ordering of the set of task embedding vectors and a set of linear token embeddings, or
a set of head component parameters.

10. The UE of claim 1, wherein the transformer configuration indicates a reporting configuration, and wherein the one or more processors, to transmit the at least one latent vector, are configured to transmit the at least one latent vector based at least in part on the reporting configuration.

11. The UE of claim 10, wherein the reporting configuration comprises at least one of:
an indication of a reporting period,
an indication of a reporting offset time, or
an indication of a task-based reporting scheme.

12. The UE of claim 1, wherein the one or more processors are further configured to receive a downlink control information (DCI) transmission that includes an indication to report the at least one latent vector, and wherein the one or more processors, to transmit the at least one latent vector, are configured to transmit the at least one latent vector based at least in part on receiving the DCI transmission.

13. A network entity for wireless communication, comprising:
one or more memories; and
one or more processors, coupled to the one or more memories, configured to:
transmit, to a user equipment (UE), a transformer configuration that includes a transmitter neural network configured to be used to generate at least one latent vector corresponding to one or more computation tasks of a plurality of computation tasks associated with a transformer-based cross-node machine learning system, wherein the transformer-based cross-node machine learning system comprises the transmitter neural network instantiated by the UE; and
receive, from the UE and based at least in part on instantiation of the transmitter neural network by the UE, the at least one latent vector.

14. The network entity of claim 13, wherein the one or more processors are further configured to:
transmit, to at least one additional UE, at least one additional transformer configuration that includes at least one additional transmitter neural network configured to be used to generate at least one additional latent vector corresponding to one or more additional computation tasks of the plurality of computation tasks associated with the transformer-based cross-node machine learning system; and
receive, from the at least one additional UE, the at least one additional latent vector.

15. The network entity of claim 13, wherein the transformer-based cross-node machine learning system further comprises a receiver neural network instantiated by the network entity.

16. The network entity of claim 13, wherein the transformer-based cross-node machine learning system further comprises a plurality of receiver neural networks instantiated by the network entity, wherein each receiver neural network of the plurality of receiver neural networks corresponds to a computation task of the plurality of computation tasks.

17. The network entity of claim 16, wherein the transmitter neural network comprises one or more layers of a transmitter instance of a head module corresponding to a computation task of the one or more computation tasks, and wherein a receiver neural network of the plurality of receiver neural networks comprises one or more additional layers of a receiver instance of the head module.

18. The network entity of claim 13, wherein the transformer-based cross-node machine learning system further comprises at least one additional transmitter neural network instantiated by at least one additional UE.

19. The network entity of claim 13, wherein the one or more processors are further configured to provide the latent vector as input to a receiver neural network corresponding to a computation task of the plurality of computation tasks.

20. The network entity of claim 19, wherein the receiver neural network comprises:
a mapping head module instance corresponding to the computation task, wherein the mapping head module instance maps the latent vector to a mapped embedding vector;
a receiver positional encoding component that takes, as input, the mapped embedding vector and a set of zero vectors, and wherein the receiver positional encoding component generates a set of token queries corresponding to the set of zero vectors and a position-encoded mapped embedding vector corresponding to the mapped embedding vector;
a receiver transformer encoder that takes, as input, the set of token queries and the position-encoded mapped embedding vector, wherein the receiver transformer encoder generates a set of unpacked token vectors corresponding to the set of token queries; and
a set of estimation head modules that take, as input, the set of unpacked token vectors, wherein each estimation head module of the set of estimation head modules generates an estimated input token.

21. The network entity of claim 13, wherein the at least one latent vector comprises an output of one or more layers of a head module instance corresponding to a computation task of the one or more computation tasks.

22. The network entity of claim 13, wherein the one or more processors, to transmit the transformer configuration, are configured to transmit an upper-layer communication including the transformer configuration.

23. The network entity of claim 22, wherein the upper-layer communication comprises a radio resource control message.

24. The network entity of claim 13, wherein the transformer configuration indicates at least one of:
a set of transmitter transformer encoder parameters,
a position embedding matrix,
a linear projection matrix,
a set of task embedding vectors,
an indication of an ordering of the set of task embedding vectors and a set of linear token embeddings, or
a set of head component parameters.

25. The network entity of claim 13, wherein the transformer configuration indicates a reporting configuration, and wherein the one or more processors, to receive the at least one latent vector, are configured to receive the at least one latent vector based at least in part on the reporting configuration.

26. The network entity of claim 13, wherein the one or more processors are further configured to transmit a downlink control information (DCI) transmission that includes an indication to report the at least one latent vector, and wherein the one or more processors, to receive the at least one latent vector, are configured to receive the at least one latent vector based at least in part on transmitting the DCI transmission.

27. A method of wireless communication performed by a user equipment (UE), comprising:
receiving a transformer configuration that includes a transmitter neural network configured to be used to generate at least one latent vector corresponding to one or more computation tasks of a plurality of computation tasks associated with a transformer-based cross-node machine learning system, wherein the transformer-based cross-node machine learning system comprises the transmitter neural network instantiated by the UE; and
transmitting the at least one latent vector based at least in part on instantiating the transmitter neural network.

28. The method of claim 27, wherein the transformer-based cross-node machine learning system further comprises a plurality of receiver neural networks instantiated by a network entity, each receiver neural network of the plurality of receiver neural networks corresponding to a computation task of the plurality of computation tasks, wherein receiving the transformer configuration comprises receiving an upper-layer communication including the transformer configuration, and wherein the transformer configuration indicates at least one of:
a set of transmitter transformer encoder parameters,
a position embedding matrix,
a linear projection matrix,
a set of task embedding vectors,
an indication of an ordering of the set of task embedding vectors and a set of linear token embeddings, or
a set of head component parameters.

29. A method of wireless communication performed by a network entity, comprising:
transmitting, to a user equipment (UE), a transformer configuration that includes a transmitter neural network configured to be used to generate at least one latent vector corresponding to one or more computation tasks of a plurality of computation tasks associated with a transformer-based cross-node machine learning system, wherein the transformer-based cross-node machine learning system comprises the transmitter neural network instantiated by the UE; and
receiving, from the UE and based at least in part on instantiation of the transmitter neural network by the UE, the at least one latent vector.

30. The method of claim 29, further comprising:
transmitting, to at least one additional UE, at least one additional transformer configuration that includes at least one additional transmitter neural network configured to be used to generate at least one additional latent vector corresponding to one or more additional computation tasks of the plurality of computation tasks associated with the transformer-based cross-node machine learning system; and
receiving, from the at least one additional UE, the at least one additional latent vector.

* * * * *